United States Patent
Noda et al.

(10) Patent No.: US 10,539,074 B2
(45) Date of Patent: Jan. 21, 2020

(54) TURBOCHARGER

(71) Applicant: MITSUBISHI HEAVY INDUSTRIES ENGINE & TURBOCHARGER, LTD., Kanagawa (JP)

(72) Inventors: Yoshitomo Noda, Tokyo (JP); Motoki Ebisu, Tokyo (JP)

(73) Assignee: MITSUBISHI HEAVY INDUSTRIES ENGINE & TURBOCHARGER, LTD., Kanagawa (JP)

( * ) Notice: Subject to any disclaimer, the term of this patent is extended or adjusted under 35 U.S.C. 154(b) by 0 days.

(21) Appl. No.: 15/565,496

(22) PCT Filed: Apr. 15, 2015

(86) PCT No.: PCT/JP2015/061569
§ 371 (c)(1),
(2) Date: Oct. 10, 2017

(87) PCT Pub. No.: WO2016/166832
PCT Pub. Date: Oct. 20, 2016

(65) Prior Publication Data
US 2018/0073433 A1 Mar. 15, 2018

(51) Int. Cl.
*F02C 7/06* (2006.01)
*F02C 6/12* (2006.01)

(52) U.S. Cl.
CPC ............... *F02C 7/06* (2013.01); *F02C 6/12* (2013.01); *F05D 2220/40* (2013.01); *F05D 2260/96* (2013.01); *F05D 2260/98* (2013.01)

(58) Field of Classification Search
CPC .. F16C 2360/24; F16C 35/077; F16C 25/083; F16C 35/067; F16C 27/04; F16C 35/063; F16C 21/00; F05D 2220/40
See application file for complete search history.

(56) References Cited

U.S. PATENT DOCUMENTS

| 5,246,352 A | 9/1993 | Kawakami |
| 8,636,413 B2 * | 1/2014 | Fiedler .................. F01D 25/164 384/535 |

(Continued)

FOREIGN PATENT DOCUMENTS

| JP | 5-71358 A | 3/1993 |
| JP | 7-10037 Y2 | 3/1995 |

(Continued)

OTHER PUBLICATIONS

International Search Report and Written Opinion of the International Searching Authority (Forms PCT/ISA/237 and PCT/ISA/210), dated Jul. 21, 2015, for International Application No. PCT/JP2015/061569, with an English translation.

*Primary Examiner* — Long T Tran
(74) *Attorney, Agent, or Firm* — Birch, Stewart, Kolasch & Birch, LLP

(57) ABSTRACT

A turbocharger includes a rotating shaft which extends along an axial line thereof, a turbine rotor which is provided on one end side of the rotating shaft, a compressor rotor which is provided on the other end side of the rotating shaft, a roller bearing which rotatably supports the rotating shaft around the axis line between the turbine rotor and the compressor rotor, a housing which covers the roller bearing from an outer peripheral side of the roller bearing, and a tubular sleeve which is provided inside the housing, which is disposed on an outer peripheral side of an outer ring of the roller bearing with a gap for holding a lubricant between the sleeve and the outer ring, and at least part of which is formed of a damping material.

19 Claims, 6 Drawing Sheets

(56) References Cited

U.S. PATENT DOCUMENTS

| | | | |
|---|---|---|---|
| 8,807,840 B2* | 8/2014 | House | F01D 25/16 384/476 |
| 2011/0274379 A1* | 11/2011 | Fiedler | F01D 25/164 384/91 |
| 2013/0071243 A1* | 3/2013 | Kocher | F01D 25/18 415/230 |
| 2013/0121858 A1 | 5/2013 | Sekita | |
| 2013/0216406 A1* | 8/2013 | Berruet | F01D 25/16 417/407 |
| 2014/0086731 A1 | 3/2014 | Schmidt et al. | |
| 2015/0198084 A1* | 7/2015 | Daimer | F02B 47/08 415/62 |

FOREIGN PATENT DOCUMENTS

| | | |
|---|---|---|
| JP | 2009-270612 A | 11/2009 |
| JP | 2011-137395 A | 7/2011 |
| JP | 2013-177900 A | 9/2013 |
| WO | WO 2010/123764 A2 | 10/2010 |

\* cited by examiner

TURBOCHARGER

TECHNICAL FIELD

The present invention relates to a turbocharger.

BACKGROUND ART

As turbochargers, there is a turbocharger in which a rotating shaft is supported by a roller bearing. The turbocharger includes a housing having a tubular accommodation portion for accommodating the roller bearing. An outer ring of the roller bearing is fitted into the accommodation portion of the housing, and thus, the roller bearing is supported by the housing. The rotating shaft of the turbocharger is fitted into an inner ring which is rotatable. Accordingly, the rotating shaft can rotate relative to the housing.

In the turbocharger, it is necessary to decrease noise and vibrations during the rotation of the rotating shaft.

PTL 1 discloses a configuration in which an oil film is interposed in a minute gap between an inner peripheral surface of the accommodation portion of the housing and an outer peripheral surface of the outer ring of the roller bearing. According to this configuration, when vibrations are generated by the rotating shaft, damping effects (effects of damping vibrations) can be obtained by a squeeze film damper phenomenon of the oil film.

CITATION LIST

Patent Literature

[PTL 1] Japanese Unexamined Patent Application, First Publication No. 2009-270612

SUMMARY OF INVENTION

Technical Problem

In various devices, improvement with respect to noise and vibrations during an operation is always required. Also in a turbocharger, it is necessary to further reduce noise and vibrations during an operation.

An object of the present invention is to provide a turbocharger capable of further reducing noise and vibrations during an operation.

Solution to Problem

According to a first aspect of the present invention, a turbocharger includes a rotating shaft which extends along an axial line thereof, a turbine rotor which is provided on one end side of the rotating shaft, and a compressor rotor which is provided on the other end side of the rotating shaft. The turbocharger further includes a roller bearing which rotatably supports the rotating shaft around the axis line between the turbine rotor and the compressor rotor, and a housing which covers the roller bearing from an outer peripheral side of the roller bearing. The turbocharger further includes a sleeve which is provided inside the housing, is disposed on an outer peripheral side of an outer ring of the roller bearing with a gap for holding a lubricant between the sleeve and the outer ring, and at least part of which is formed of a damping material.

A second aspect of the present invention provides the turbocharger according to the first aspect, and the sleeve may include a first sleeve disposed on an inner peripheral side and a second sleeve disposed on an outer peripheral side of the first sleeve.

A third aspect of the present invention provides the turbocharger according to the second aspect, and the first sleeve and the second sleeve may be formed of different damping materials from each other.

A fourth aspect of the present invention provides the turbocharger according to the second or third aspect, and one of the first sleeve and the second sleeve may be formed of a metal material and the other of the first sleeve and the second sleeve may be formed of a damping material.

A fifth aspect of the present invention provides the turbocharger of any one of the second to fourth aspects, and the first sleeve may be formed of a material having higher rigidity than that of the second sleeve.

Advantageous Effects of Invention

According to the above-described turbocharger, it is possible to further reduce noise or vibrations during the operation.

DESCRIPTION OF EMBODIMENTS

First Embodiment

Figure 1:
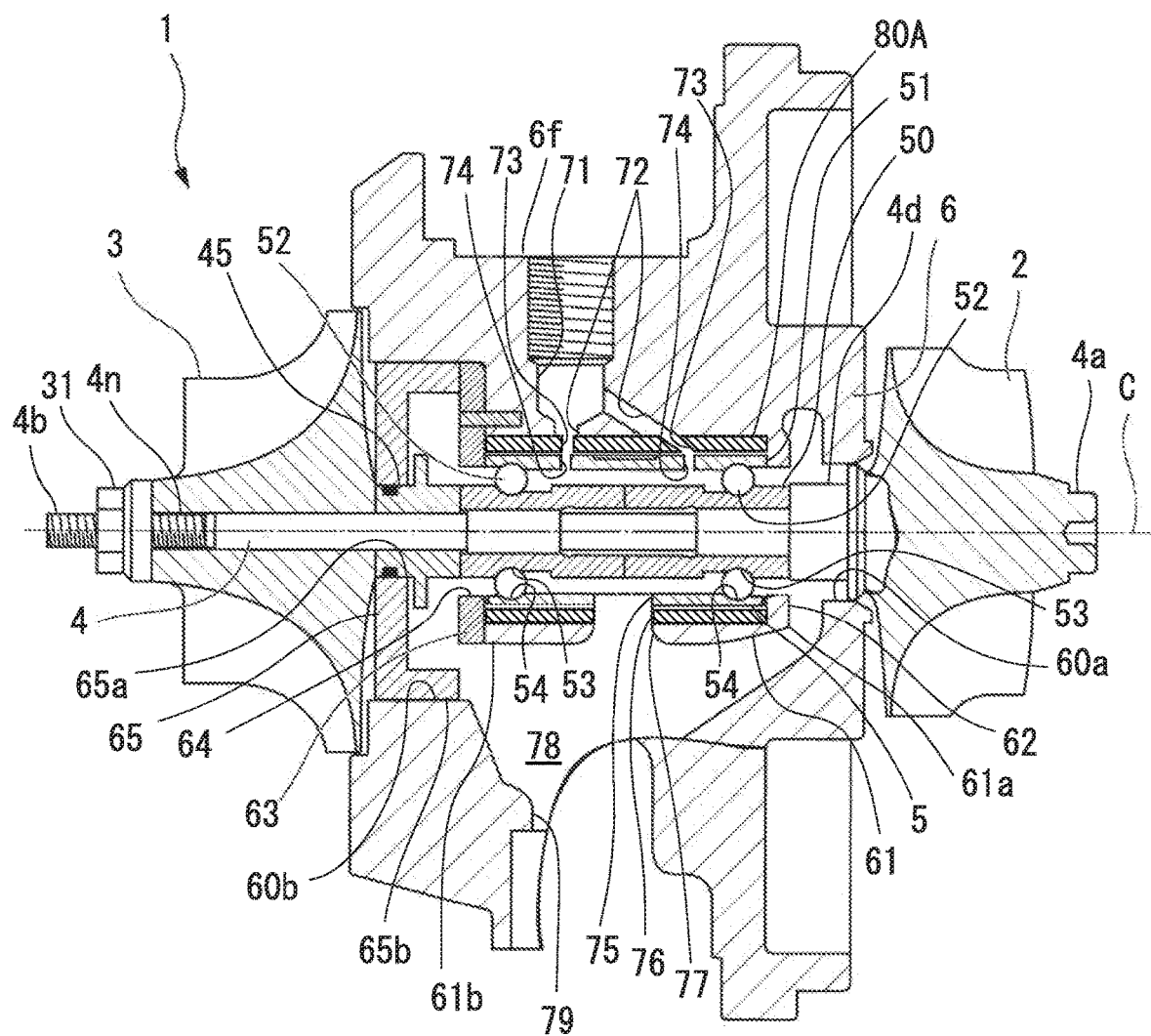
FIG. 1 is a sectional view showing a configuration of a turbocharger in a first embodiment of the present invention.
Figure 2:
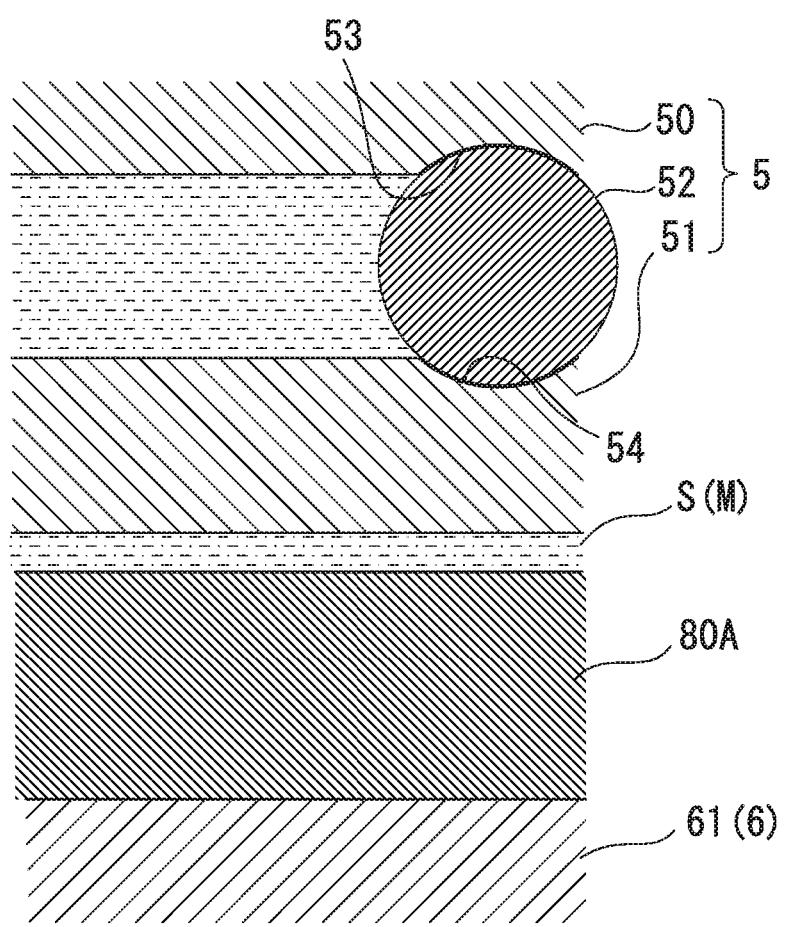
FIG. 2 is an enlarged sectional view showing a sleeve provided in the turbocharger in the first embodiment of the present invention.

FIG. 1 is a sectional view showing a configuration of a turbocharger in a first embodiment of the present invention. FIG. 2 is an enlarged cross-sectional view showing a sleeve provided in the turbocharger in the first embodiment of the present invention.

As shown in FIG. 1, a turbocharger 1 includes a turbine rotor 2, a compressor rotor 3, a rotating shaft 4, a roller bearing 5, and a housing 6. The turbocharger 1 is mounted on an automobile or the like in a state where the rotating shaft 4 horizontally extends. Here, a dashed line shown in FIG. 1 indicates a central axis C of the rotating shaft 4. In the following descriptions, a side facing the upper side in a state where the turbocharger 1 is mounted on an automobile or the like is referred to an "upper side", and a side facing the lower side is referred to as a "lower side".

In the turbocharger 1, the turbine rotor 2 rotates about the central axis C by an exhaust gas flow supplied from an engine which is not shown. The rotating shaft 4 and the compressor rotor 3 rotate about the central axis C according to the rotation of the turbine rotor 2. The compressor rotor 3 compresses air by a rotation thereof. Compressed air is supplied to the engine which is not shown.

For example, the housing 6 is supported by a vehicle body or the like via a bracket (not shown), a compressor, a turbine, or the like. The housing 6 includes an accommodation portion 61 in which the roller bearing 5 is accommodated. In addition, the housing 6 includes an opening portion 60a on one end side of the housing in a direction in which the central axis C extends and an opening portion 60b on the other end side of the housing. The rotating shaft 4 is rotatably supported around the central axis C by the roller bearing 5 accommodated in the accommodation portion 61. A first end portion 4a and a second end portion 4b of the rotating shaft 4 protrude toward the outside of the housing 6 through the opening portions 60a and 60b.

The turbine rotor 2 and the compressor rotor 3 are respectively disposed on the one end side and the other end side of the housing 6. The turbine rotor 2 is integrally provided with the first end portion 4a of the rotating shaft 4. The compressor rotor 3 is connected to the second end portion 4b by a screw action between a screw portion 4n formed on the second end portion 4b of the rotating shaft 4 and a nut 31. The rotating shaft 4, the turbine rotor 2, the compressor rotor 3, and the rotating shaft 4 integrally rotate around the central axis C.

The roller bearing 5 includes an inner ring 50, an outer ring 51, a rolling element 52, and a retainer (not shown).

The inner ring 50 is formed in a cylindrical shape. The inner ring 50 is fixed on an outer peripheral surface of the rotating shaft 4 by fitting or the like and integrally rotates with the rotating shaft 4.

The outer ring 51 is formed in a cylindrical shape having a larger diameter than that of the inner ring 50. The outer ring 51 is disposed on an outer peripheral side of the inner ring 50 and is radially disposed apart from the inner ring 50.

The rolling element 52 is formed in a spherical shape. A plurality of rolling elements 52 are provided between the inner ring 50 and the outer ring 51. The plurality of rolling elements 52 are provided at intervals in a circumferential direction of the rotating shaft by the above-described retainer. On the outer peripheral surface of the inner ring 50, raceway grooves 53 continuous in the circumferential direction are formed on both end portions in the axial direction in which the central axis C extends. Similarly, on the inner peripheral surface of the outer ring 51, raceway grooves 54 continuous in the circumferential direction are formed so as to face the outer peripheral sides of the raceway grooves 53 on the both end portions in the direction of the central axis C. The plurality of rolling elements 52 are interposed between the raceway grooves 53 and 54 on both end portions of the roller bearing 5 in the axial direction in which the central axis C extends. Accordingly, if the inner ring 50 rotates along with the rotating shaft 4 with respect to the outer ring 51, the plurality of rolling elements 52 roll between the inner ring 50 and the outer ring 51.

The accommodation portion 61 formed inside the housing 6 is formed in a circular shape in a cross section when viewed in the axial direction in which the central axis C extends. The accommodation portion 61 is formed to be continuous in the axial direction in which the central axis C extends. The roller bearing 5 is accommodated in the accommodation portion 61.

As shown in FIGS. 1 and 2, a sleeve 80A is fixed to the inside of the accommodation portion 61 by fitting or the like. In this embodiment, a case where the sleeve 80A is formed in a cylindrical shape is described as an example. The sleeve 80A can be formed of a so-called damping alloy. Specifically, as the damping alloy for forming the sleeve 80A, for example, flaky graphite cast iron, an aluminum zinc (Al—Zn) alloy, a magnesium (Mg) alloy, iron (Fe) 13% chromium (Cr), a nickel titanium (Ni—Ti) alloy, a copper-aluminum-nickel (Cu—Al—Ni) alloy, a manganese-copper (Mn—Cu) alloy, or the like can be given as examples.

The outer ring 51 of the roller bearing 5 is inserted into the sleeve 80A. An inner diameter of the sleeve 80A is slightly larger than an outer diameter of the outer ring 51 of the roller bearing 5. Accordingly, a gap S is formed between the outer peripheral surface of the outer ring 51 of the roller bearing 5 and the inner peripheral surface of the sleeve 80A.

As shown in FIG. 1, in the accommodation portion 61, a thrust bearing portion 62 is formed on an end portion 61a on a position close to the turbine rotor 2 being disposed. The thrust bearing portion 62 receives a thrust load of the roller bearing 5 to the position close to the turbine rotor 2 being disposed. The thrust bearing portion 62 protrudes inwardly in a radial direction of the rotating shaft from the end portion 61a of the accommodation portion 61. An end portion, at the position close to the turbine rotor 2 being disposed, of the sleeve 80A accommodated in the accommodation portion 61 and an end portion, at the position close to the turbine rotor 2 being disposed, of the outer ring 51 of the roller bearing 5 are in a state of abutting on the thrust bearing portion 62.

In addition, in the accommodation portion 61, a thrust bearing member 63 is attached to an end portion 61b of a portion close to the compressor rotor 3 being disposed. The thrust bearing member 63 receives a thrust load of the roller bearing 5 to the portion close to the compressor rotor 3 being disposed. The thrust bearing member 63 is formed in a disk shape having an opening portion 64 at the center portion thereof. An end portion, at the position close to the compressor rotor 3 being disposed, of the sleeve 80A and an end portion, at the position close to the compressor rotor 3 being disposed, of the outer ring 51 are in a state of abutting on a peripheral edge portion of the opening portion 64 of the thrust bearing member 63. Here, the thrust bearing portion 62 and the thrust bearing member 63 may be provided as necessary or may be omitted.

The rotating shaft 4 has a large diameter portion 4d at the portion close to the turbine rotor 2 being disposed with respect to inner ring 50 of the roller bearing 5. The large diameter portion 4d has a larger outer diameter than an inner diameter of the inner ring 50. The inner ring 50 is provided in a state where the end portion at the portion close to the turbine rotor 2 being disposed abuts on the larger diameter portion 4d of the rotating shaft 4.

In addition, in the rotating shaft 4, a bush 45 having a cylindrical shape is provided on the portion close to the compressor rotor 3 being disposed with respect to the inner ring 50 of the roller bearing 5. The bush 45 is provided so as to be interposed between the inner ring 50 and the compressor rotor 3.

In this way, the inner ring 50 of the roller bearing 5 is provided to be interposed between the larger diameter portion 4d of the rotating shaft 4 and the bush 45.

In the opening portion 6b of the housing 6, a plate 65 which closes the opening portion 60b is provided. The plate 65 is formed in a disk shape having an opening portion 65a at the center portion thereof. A peripheral wall portion 65b extending toward a portion close to the thrust bearing member 63 being disposed in the axial direction in which the central axis C extends is integrally formed with the outer peripheral portion of the plate 65. The plate 65 is provided in a state where the bush 45 is inserted into the opening portion 65a and the peripheral wall portion 65b abuts on the thrust bearing member 63.

In addition, the housing 6 has the following configurations to lubricate the roller bearing 5 by a lubricant.

An oil supply pipe connection port 71 which extends from an outer peripheral surface 6f toward an inside in the radial direction of the housing 6 is formed in the housing 6. A lubricant supply pipe (not shown) for supplying a lubricant is connected to the oil supply pipe connection port 71.

A plurality of supply flow paths 72 are formed between the distal end portion of the oil supply pipe connection port 71 and the accommodation portion 61. Each of the supply flow paths 72 is open to an inside from the rolling element 52 which is provided on both end portions of the roller bearing 5.

In addition, in the sleeve 80A accommodated in the accommodation portion 61 and the outer ring 51 of the roller bearing 5, lubricant introduction holes 73 and 74 which penetrate the sleeve 80A and the outer ring 51 in the radial direction, that is, in a thickness direction of each of the sleeve 80A and the outer ring 51, are formed at positions facing the supply flow paths 72 which open to the inner surface of the accommodation portion 61.

In addition, discharge flow paths 75, 76, and 77 penetrating the outer ring 51, the sleeve 80A, and the accommodation portion 61 toward the lower side are provided on the lowest end portions of the outer ring 51 of the roller bearing 5, the sleeve 80A, and the accommodation portion 61.

The housing 6 includes an oil discharge chamber 78 below the accommodation portion 61. The discharge flow paths 75, 76, and 77 are open to the upper portion of the oil discharge chamber 78. In addition, an oil discharge port 79 which penetrates the lower end portion of the oil discharge chamber 78 and the outer peripheral surface 6f positioned at the lowest portion of the housing 6 is formed in the housing 6.

First, if a lubricant is fed from the lubricant supply pipe (not shown) connected to the oil supply pipe connection port 71, the lubricant is fed from the distal end portion of the oil supply pipe connection port 71 into the accommodation portion 61 via the supply flow path 72. The lubricant fed into the accommodation portion 61 is further fed into the inside of the outer ring 51 via the lubricant introduction holes 73 and 74. Accordingly, the lubricant is supplied to a portion between the inner ring 50 and the outer ring 51 of the roller bearing 5 and the rolling elements 52 is lubricated.

Part of the lubricant which has passed through the lubrication introduction holes 73 formed in the sleeve 80A flows into the gap S (refer to FIG. 2) between the sleeve 80A and the outer ring 51. Accordingly, an oil film M is formed between the sleeve 80A and the outer ring 51.

The lubricant fed into the portion between the outer ring 51 and the inner ring 50 of the roller bearing 5 is discharged to the oil discharge chamber 78 via the discharge flow path 75 formed in the outer ring 51, the discharge flow path 76 formed in the sleeve 80A, and the discharge flow path 77 formed in the accommodation portion 61.

The lubricant fed into the gap S (refer to FIG. 2) between the sleeve 80A and the outer ring 51 flows from peripheral edge portions of the discharge flow paths 75 and 76 to the discharge flow paths 76 and 77 and is discharged to the oil discharge chamber 78.

The lubricant in the oil discharge chamber 78 is discharged to the outside of the housing 6 through the oil discharge port 79.

In the above-described first embodiment, the sleeve 80A formed of a damping material is provided on the outer peripheral side of the outer ring 51 of the roller bearing 5 with the gap S in which the oil film M is formed. Accordingly, during the operation of the turbocharger 1, noise or vibrations generated by the roller bearing 5 or the like according to the rotation of the rotating shaft 4 can be reduced by the oil film M and the sleeve 80A. Therefore, it is possible to prevent noise or vibrations from being transmitted to the outside of the turbocharger 1 via the housing 6. As a result, it is possible to further reduce noise or vibrations during the operation of the turbocharger 1.

Second Embodiment

Next, a second embodiment of the turbocharger according to the present invention will be described. The turbocharger of the second embodiment is different from the turbocharger of the first embodiment only in terms of a sleeve 80B provided on the outer peripheral side of the outer ring 51 of the roller bearing 5. Accordingly, in the descriptions of the second embodiment, the same reference numerals are assigned to the same portions as those of the first embodiment, and overlapping descriptions thereof are omitted. That is, descriptions of the entire configuration of the turbocharger 1 common to the configurations described in the first embodiment are omitted.

Figure 3:
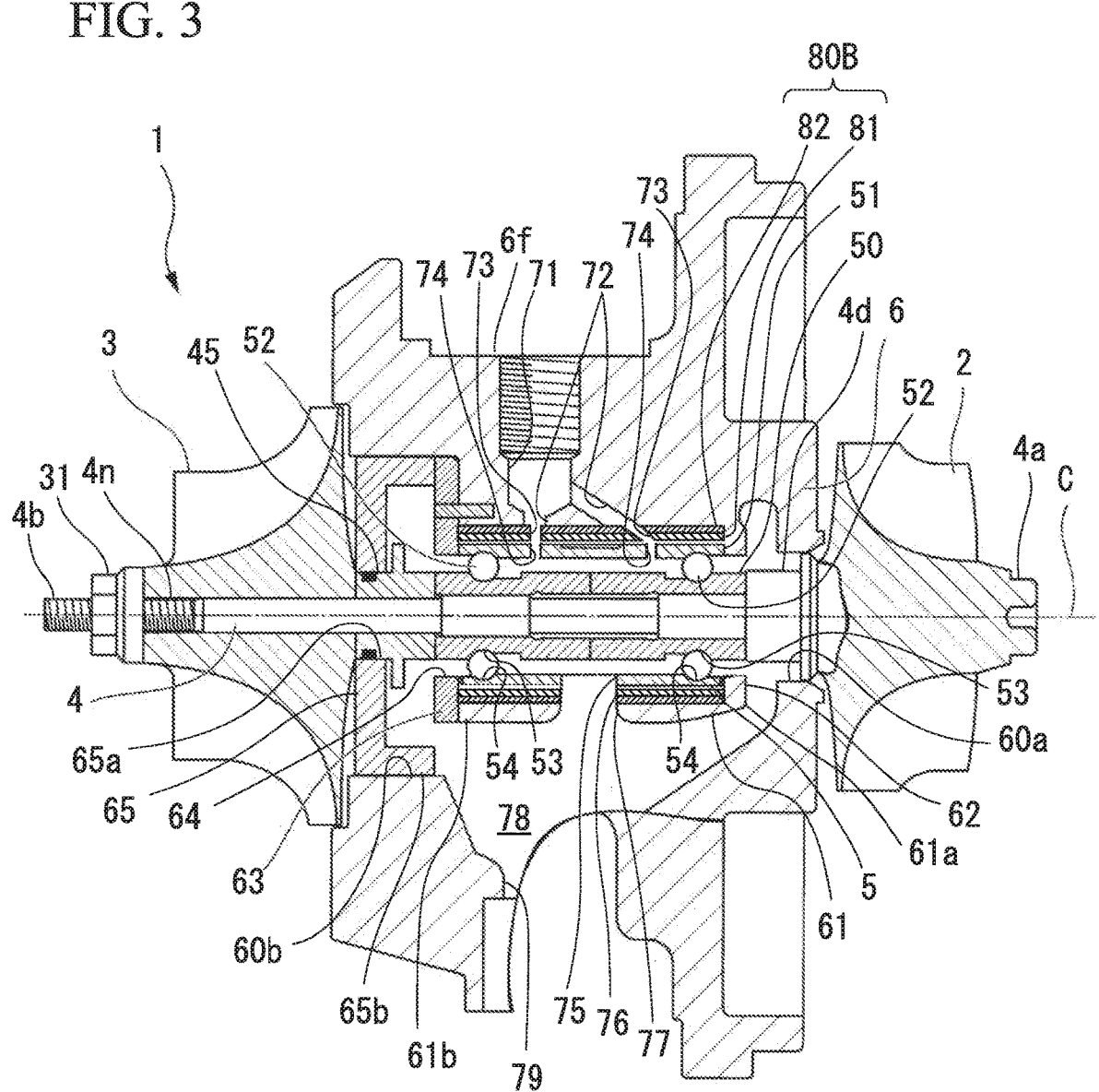
FIG. 3 is a sectional view showing a configuration of a turbocharger in a second embodiment of the present invention.
Figure 4:
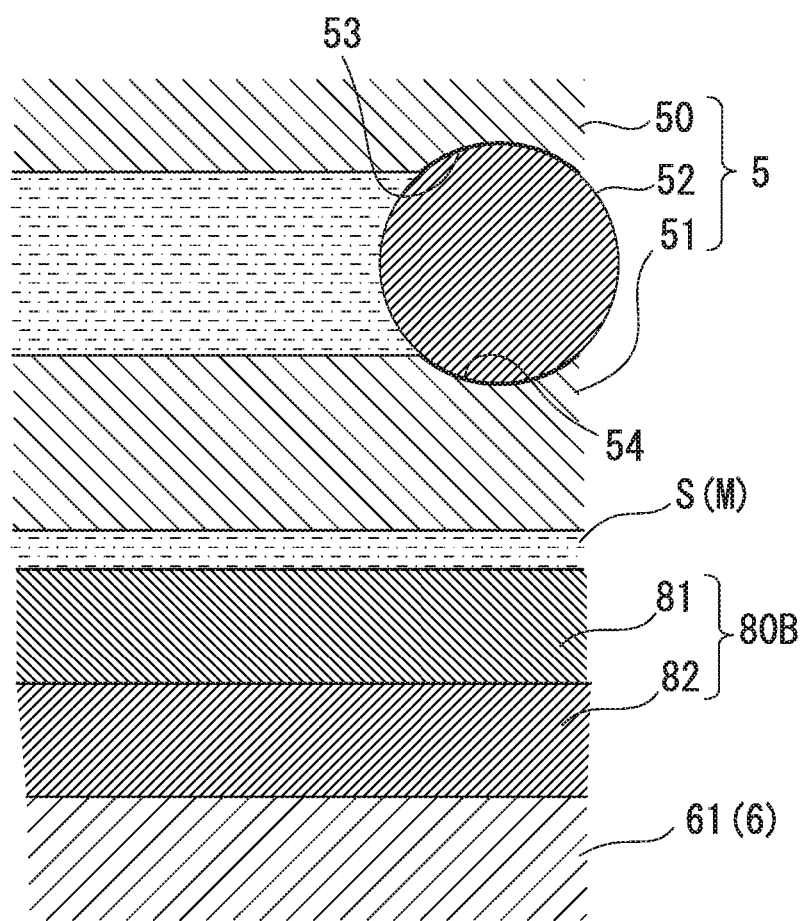
FIG. 4 is an enlarged sectional view showing a sleeve provided in the turbocharger in the second embodiment of the present invention.

FIG. 3 is a sectional view showing a configuration of a turbocharger in a second embodiment of the present invention. FIG. 4 is an enlarged cross-sectional view showing a sleeve provided in the turbocharger in the second embodiment of the present invention.

As shown in FIG. 3, a cylindrical sleeve 80B is fitted into the accommodation portion 61.

The sleeve 80B has a double structure including a first sleeve 81 provided on the inner peripheral side and a second sleeve 82 provided on the outer peripheral side of the first sleeve 81.

The first sleeve 81 needs to support the outer ring of the roller bearing 5, and thus, the first sleeve 81 is formed to combine a material having higher rigidity than that of the second sleeve 82. For example, the first sleeve 81 can be formed of a metal material. Here, the first sleeve 81 may be formed of a metal material which is not a damping material. However, if the first sleeve 81 is formed of a metallic damping material, damping performance in the sleeve 80B is further increased. Similarly to the sleeve 80A in the first embodiment, as the damping material, for example, damping alloys such as flaky graphite cast iron, an aluminum zinc (Al—Zn) alloy, a magnesium (Mg) alloy, iron (Fe) 13% chromium (Cr), a nickel titanium (Ni—Ti) alloy, a copper-aluminum-nickel (Cu—Al—Ni) alloy, or a manganese-copper (Mn—Cu) alloy can be given as examples.

The second sleeve 82 is formed of a damping material. As the damping material forming the second sleeve 82, for example, resin materials such as polyetheretherketone (PEEK), polyphenylene sulfide (PPS), polytetrafluoroethylene (PTFE), polyethersulfone (PES), polyamideimide (PAT), polypromeritimide (aromatic polyimide PI), polyarylate (aromatic polyester), polymetaphenylene, or a fluorine resin can be given as examples.

In addition, the second sleeve 82 may be formed of damping materials such as a rubber material or a ceramic material in addition to the above-described materials.

The second sleeve 82 may be formed of a damping alloy different from that of the first sleeve 81 among the damping alloys described as the material of the first sleeve 81.

The temperature inside the housing 6 is high during the operation of the turbocharger 1. Accordingly, preferably, the first sleeve 81 and the second sleeve 82 are formed of a material having a heat resistance with respect to the temperature inside the housing during the operation of the turbocharger.

Here, an upper limit of a continuously usable temperature of the resin materials exemplified as the damping material of the second sleeve 82 is 240° C. for polyetheretherketone and is 220° C. for polyphenylene sulfide (PPS). In addition, the upper limit is 260° C. for polytetrafluoroethylene (PTFE), is 180° C. for polyethersulfone (PES), and is 210° C. for polyamideimide (PAI). In addition, the upper limit is 300° C. for polypromeritimide (aromatic polyimide PI), is 300° C. for polyarylate (aromatic polyester), is 220° C. for polymetaphenylene, and is 250° C. for a fluorine resin.

Similarly to the first embodiment, in the above-described second embodiment, the sleeve 80B formed of a damping material is provided on the outer peripheral side of the outer ring 51 of the roller bearing 5 with the gap S in which the oil film M is formed. Accordingly, during the operation of the turbocharger 1, noise or vibrations generated by the roller bearing 5 or the like according to the rotation of the rotating shaft 4 can be reduced by the oil film M and the sleeve 80B. Therefore, it is possible to prevent noise or vibrations from being transmitted to the outside of the turbocharger 1 via the housing 6. As a result, it is possible to further reduce noise or vibrations during the operation of the turbocharger 1.

Moreover, the sleeve 80B has a double structure including the first sleeve 81 on the inner peripheral side and the second sleeve 82 on the outer peripheral side. In addition, the first sleeve 81 is formed of a material having higher rigidity than that of the second sleeve 82. Therefore, damping performance can be exerted by the softer second sleeve 82 while the roller bearing 5 is firmly supported by the first sleeve 81.

In addition, when the first sleeve 81 and the second sleeve 82 are formed of different damping materials from each other, it is possible to more effectively exert the damping performance.

The material forming the first sleeve 81 and the material forming the second sleeve 82 described in the second embodiment can be replaced with each other to form the sleeve 80B.

Other Embodiments

The present invention is not limited to the above-described embodiments and design thereof can be changed within a scope which does not depart from the gist of the present invention.

For example, the above-described second embodiment has the sleeve 80B formed by a double structure including the first sleeve 81 and the second sleeve 82. However, a single sleeve having a two-layer structure including a layer on an inner peripheral surface side of the single sleeve and a layer on an outer peripheral surface side of the single sleeve and formed of different materials from each other may be applied. For example, a damping layer formed of a damping material described in the above-described embodiments may be integrally formed on the inner peripheral surface or the outer peripheral surface of a metal tubular body.

In the above-described embodiments, the sleeves 80A and 80B are formed in a cylindrical shape. However, the present invention is not limited to this. FIGS. 5 to 8 are views showing outlines of modification examples of the sleeves 80A and 80B shown in the above-described first and second embodiments.

Figure 5:
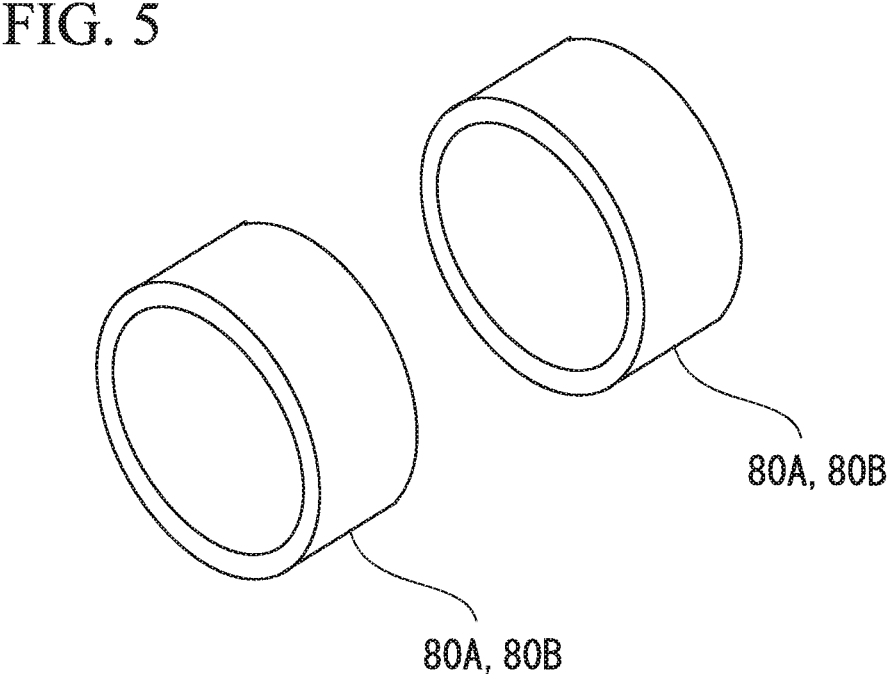
FIG. 5 is a perspective view showing an example of another shape of the sleeve included in the turbocharger in each of the first and second embodiments of the present invention.

As shown in FIG. 5, the sleeves 80A and 80B may be formed to be shorter than the length of the outer ring 51 of the roller bearing 5 in the direction of the central axis C, and the plurality of sleeves 80A and 80B may be provided at intervals along the direction of the central axis C.

Figure 6:
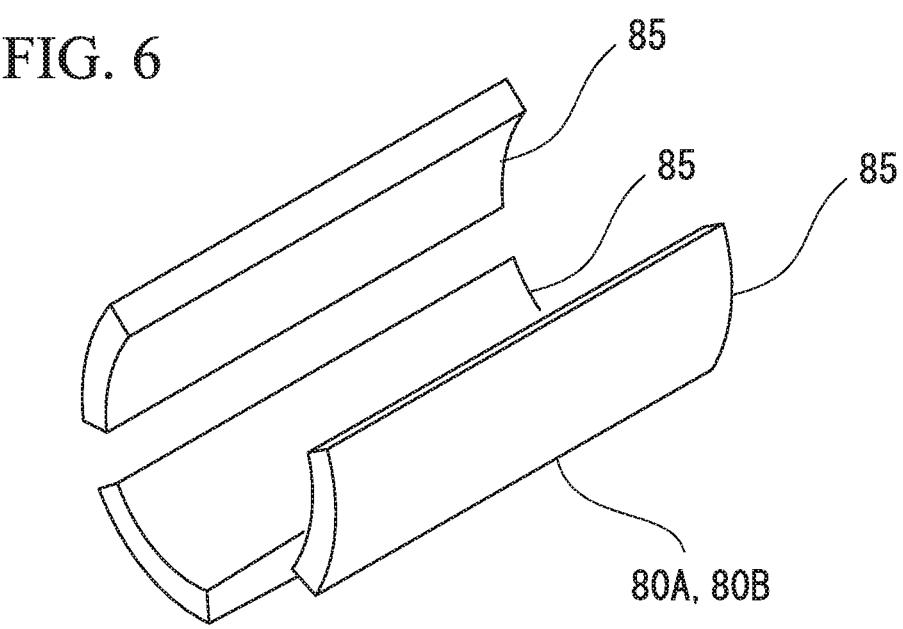
FIG. 6 is a perspective view showing an example of still another shape of the sleeve included in the turbocharger in each of the first and second embodiments of the present invention.

Moreover, as shown in FIG. 6, the sleeves 80A and 80B may be configured of a plurality of segments 85 which are divided in a circumferential direction. In addition, the plurality of segments 85 may be provided at intervals in a circumferential direction.

Figure 7:
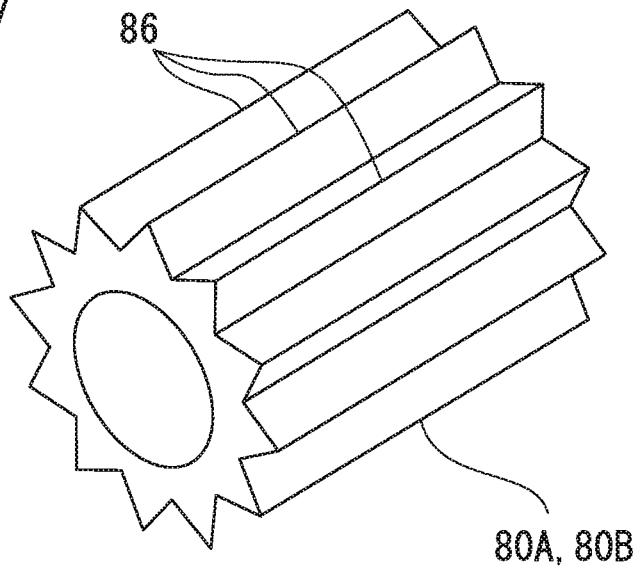
FIG. 7 is a perspective view showing an example of still another shape of the sleeve included in the turbocharger in each of the first and second embodiments of the present invention.

Moreover, as shown in FIG. 7, the sleeves 80A and 80B may be formed in a spline shape or the like in which a plurality of protrusions 86 continuous in the direction of the central axis C are provided on the outer peripheral surfaces of the sleeve 80A and 80B in the circumferential direction. In addition, recessed portions (not shown) corresponding to the protrusions 86 of the spline shapes of the sleeves 80A and 80B may be formed on the inner surface of the accommodation portion 61 of the housing 6. Accordingly, the protrusions 86 are fitted into the recessed portions, and thus, positioning of the sleeves 80A and 80B in the circumferential direction with respect to the accommodation portion 61 can be performed. Therefore, it is possible to easily perform positioning of the discharge flow path 76. Here, only the spline shape is exemplified in FIG. 7. However, the present invention is not limited to the spline shape as long as displacements of the sleeves 80A and 80B in the circumferential direction with respect to the accommodation portion 61 can be prevented. In addition, the number of the formed protrusions 86 is not limited to plural.

Figure 8:
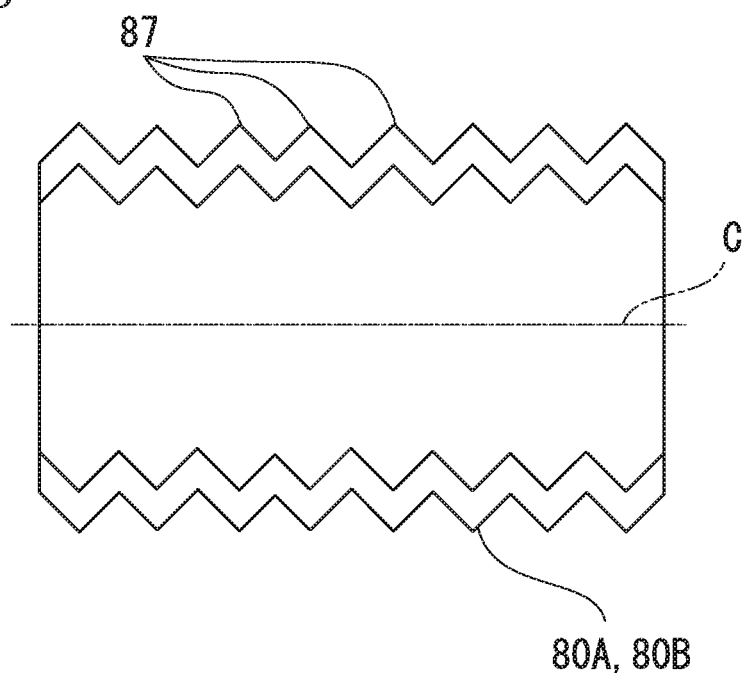
FIG. 8 is a sectional view showing an example of still another shape of the sleeve included in the turbocharger in each of the first and second embodiments of the present invention.

Moreover, as shown in FIG. 8, the sleeves 80A and 80B may be formed in a so-called bellows shape in which irregularities 87 continuous in the circumferential direction around the central axis C are formed to be continued in the direction of the central axis C.

Even with this shape, it is possible to decrease a contact area between the sleeves 80A and 80B and the accommodation portion 61 on the outer peripheral side and thus, vibrations or noise is not easily transmitted.

In addition, for example, an O-ring or the like for holding the oil film M may be provided between the outer ring 51 of the roller bearing 5 and the sleeve 80A or between the outer ring 51 of the roller bearing 5 and the sleeve 80B. The O-ring is provided in both end portions of the outer ring 51 and the sleeve 80A in the direction of the central axis C.

Moreover, the configuration of the roller bearing 5 is not limited to the above-described embodiment and may be appropriately modified.

In addition, for example, in the above-described embodiments, only one roller bearing 5 is provided. However, the present invention is not limited to this, and for example, a plurality of roller bearings may be provided to be arranged in series in the direction of the central axis of the rotating shaft 4.

Moreover, the configuration of the turbocharger 1 is not limited to the configurations described in the embodiments and may be appropriately modified.

INDUSTRIAL APPLICABILITY

The sleeve formed of a damping material is provided on the outer peripheral side of the roller bearing with the gap in which the oil film is formed, and thus, it is possible to further reduce noise and vibrations during the operation of the turbocharger.

REFERENCE SIGNS LIST

1: turbocharger
2: turbine rotor
3: compressor rotor
4: rotating shaft
4a: first end portion
4b: second end portion
4d: large diameter portion
4n: screw portion
5: roller bearing
6: housing
6a, 6b: opening portion
6f: outer peripheral surface
31: nut
45: bush
50: inner ring
51: outer ring
52: rolling element
53, 54: raceway groove
60a: opening portion
61: accommodation portion
61a: end portion
61b: end portion
62: thrust bearing portion
63: thrust bearing member
64: opening portion
65: plate
65a: opening portion
65b: peripheral wall portion
71: oil supply pipe connection port
72: supply flow path
73, 74: lubricant introduction hole
75: discharge flow path
76: discharge flow path
77: discharge flow path
78: oil discharge chamber
79: oil discharge port
80A, 80B: sleeve
80a: one end
80b: the other end
81: first sleeve
82: second sleeve
85: segment
86: protrusion
87: irregularities
C: central axis
M: oil film
S: gap

The invention claimed is:

1. A turbocharger comprising:
a rotating shaft which extends along an axial line thereof;
a turbine rotor which is provided on one end side of the rotating shaft;
a compressor rotor which is provided on the other end side of the rotating shaft;
a roller bearing which rotatably supports the rotating shaft around the axis line between the turbine rotor and the compressor rotor;
a housing which covers the roller bearing from an outer peripheral side of the roller bearing; and
a sleeve which is provided inside the housing, which is disposed on an outer peripheral side of an outer ring of the roller bearing with a gap for holding a lubricant between an inner surface of the sleeve and the outer ring, and at least part of which is formed of a damping material,
wherein an outer surface of the sleeve includes a shape having a plurality of protrusions continuous in a direction of a central axis of the rotating shaft,
wherein recessed portions corresponding to the protrusions of the sleeve are formed on an inner surface of an accommodation portion which is formed inside the housing and in which the roller bearing is accommodated,
wherein the plurality of protrusions are fitted into the recessed portions of the accommodation portion thereby positioning the sleeve in a circumferential direction with respect to the accommodation portion.

2. The turbocharger according to claim 1, wherein the sleeve includes a first sleeve disposed on an inner peripheral side and a second sleeve disposed on an outer peripheral side of the first sleeve.

3. The turbocharger according to claim 2, wherein the first sleeve and the second sleeve are formed of different damping materials from each other.

4. The turbocharger according to claim 3, wherein one of the first sleeve and the second sleeve is formed of a metal material and the other of the first sleeve and the second sleeve is formed of a damping material.

5. The turbocharger according to claim 4, wherein the first sleeve is formed of a material having higher rigidity than that of the second sleeve.

6. The turbocharger according to claim 3, wherein the first sleeve is formed of a material having higher rigidity than that of the second sleeve.

7. The turbocharger according to claim 2, wherein one of the first sleeve and the second sleeve is formed of a metal material and the other of the first sleeve and the second sleeve is formed of a damping material.

8. The turbocharger according to claim 7, wherein the first sleeve is formed of a material having higher rigidity than that of the second sleeve.

9. The turbocharger according to claim 2, wherein the first sleeve is formed of a material having higher rigidity than that of the second sleeve.

10. The turbocharger according to claim 1, wherein a lowest end portion of each of the outer ring, the sleeve, and the accommodation portion has a discharge flow path penetrating each of the outer ring, the sleeve, and the accommodation portion toward a lower side.

11. A turbocharger comprising:
a rotating shaft which extends along an axial line thereof;
a turbine rotor which is provided on one end side of the rotating shaft;
a compressor rotor which is provided on the other end side of the rotating shaft;
a roller bearing which rotatably supports the rotating shaft around the axis line between the turbine rotor and the compressor rotor;
a housing which covers the roller bearing from an outer peripheral side of the roller bearing; and
a sleeve which is provided inside the housing, which is disposed on an outer peripheral side of an outer ring of the roller bearing with a gap for holding a lubricant between the sleeve and the outer ring, and at least part of which is formed of a damping material, wherein an accommodation portion that accommodates the roller bearing is provided inside the housing, wherein an outer peripheral surface of the sleeve on the accommodation portion side is formed in a bellows shape in which irregularities continuous in a circumferential direction around a central axis of the rotating shaft are formed to be continued in a direction of the central axis, and wherein the outer peripheral surface of the sleeve contacts with the inner peripheral surface of the accommodation portion.

12. The turbocharger according to claim 11, wherein the sleeve includes a first sleeve disposed on an inner peripheral side and a second sleeve disposed on an outer peripheral side of the first sleeve.

13. The turbocharger according to claim 12, wherein the first sleeve and the second sleeve are formed of different damping materials from each other.

14. The turbocharger according to claim 13, wherein one of the first sleeve and the second sleeve is formed of a metal material and the other of the first sleeve and the second sleeve is formed of a damping material.

15. The turbocharger according to claim 14, wherein the first sleeve is formed of a material having higher rigidity than that of the second sleeve.

16. The turbocharger according to claim 13, wherein the first sleeve is formed of a material having higher rigidity than that of the second sleeve.

17. The turbocharger according to claim 12, wherein one of the first sleeve and the second sleeve is formed of a metal material and the other of the first sleeve and the second sleeve is formed of a damping material.

18. The turbocharger according to claim 17, wherein the first sleeve is formed of a material having higher rigidity than that of the second sleeve.

19. The turbocharger according to claim 12, wherein the first sleeve is formed of a material having higher rigidity than that of the second sleeve.

* * * * *